(12) United States Patent
Brown

(10) Patent No.: US 12,279,563 B2
(45) Date of Patent: *Apr. 22, 2025

(54) STAKE STABILIZATION MEMBER AND EROSION CONTROL SYSTEM USING SAME

(71) Applicant: Arbor Stakes, LLC, Dallas, TX (US)

(72) Inventor: Kristopher M. Brown, Dallas, TX (US)

(73) Assignee: Arbor Stakes, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,021

(22) Filed: Oct. 11, 2023

(65) Prior Publication Data

US 2024/0032487 A1 Feb. 1, 2024

Related U.S. Application Data

(63) Continuation-in-part of application No. 18/449,772, filed on Aug. 15, 2023, now Pat. No. 12,022,775, which is a continuation of application No. 16/697,677, filed on Nov. 27, 2019, now Pat. No. 11,723,320.

(60) Provisional application No. 62/771,684, filed on Nov. 27, 2018.

(51) Int. Cl.
*A01G 17/04* (2006.01)
(52) U.S. Cl.
CPC .................................. *A01G 17/04* (2013.01)
(58) Field of Classification Search
CPC .... A01G 9/122; A01G 9/124; A01G 13/0237; A01G 13/0293; A01G 17/04; A01G 17/06
See application file for complete search history.

(56) References Cited

U.S. PATENT DOCUMENTS

| | | | |
|---|---|---|---|
| 3,315,411 A | | 4/1967 | Fitzgerald |
| 4,584,792 A | * | 4/1986 | Etzel ..................... A01G 9/124 47/70 |
| 4,590,705 A | * | 5/1986 | Prince ................ A01G 13/0281 47/32 |
| 4,677,788 A | | 7/1987 | Mastandrea |
| 4,926,785 A | * | 5/1990 | Lamson .............. E04H 12/2215 52/165 |

(Continued)

FOREIGN PATENT DOCUMENTS

| DE | 3504112 | 8/1986 |
|---|---|---|
| DE | 10131104 | 1/2003 |

(Continued)

OTHER PUBLICATIONS

International Search Report and Written Opinion dated Jan. 21, 2020 for International Application No. PCT/US2019/063656; 7 pages.

*Primary Examiner* — Monica L Perry
*Assistant Examiner* — Aaron M Rodziwicz
(74) *Attorney, Agent, or Firm* — Scott Griggs; Griggs Bergen LLP

(57) ABSTRACT

An arbor stake stabilization member and erosion control system using the same include a tapered stake and a stake stabilization member work in tandem to secure and stabilize the soil. The stabilization member features an annular ring made from a biodegradable material, an axial passageway for stake placement, and a non-biodegradable locking member for secure stake connection.

21 Claims, 8 Drawing Sheets

(56) References Cited

U.S. PATENT DOCUMENTS

| | | | |
|---|---|---|---|
| 5,430,971 A * | 7/1995 | Myer | A01G 13/0281 47/32 |
| 6,141,903 A * | 11/2000 | Mancini | A01G 17/04 248/351 |
| 6,625,926 B1 | 9/2003 | Mancini | |
| 8,316,579 B1 * | 11/2012 | Brown | A01G 13/0237 47/42 |
| 8,567,118 B2 | 10/2013 | Farmer et al. | |
| D738,190 S | 9/2015 | Davtian | |
| 9,894,846 B1 | 2/2018 | Young | |
| 2005/0132645 A1 | 6/2005 | Johns | |
| 2006/0185232 A1 * | 8/2006 | Spicer | A01G 17/04 47/42 |
| 2012/0000123 A1 | 1/2012 | Donaldson | |
| 2015/0020858 A1 * | 1/2015 | Kubert | A45C 3/00 135/118 |
| 2016/0219798 A1 | 8/2016 | Bowie | |
| 2017/0172073 A1 | 6/2017 | Van Den Heever | |
| 2020/0068812 A1 | 3/2020 | Patterson et al. | |

FOREIGN PATENT DOCUMENTS

| | | | |
|---|---|---|---|
| DE | 10131104 A1 * | 1/2003 | A01G 13/0293 |
| EP | 2505718 | 10/2012 | |
| EP | 2505718 A1 * | 10/2012 | A01G 13/0293 |
| EP | 3130219 | 2/2017 | |
| GB | 191212899 | 3/1913 | |

\* cited by examiner

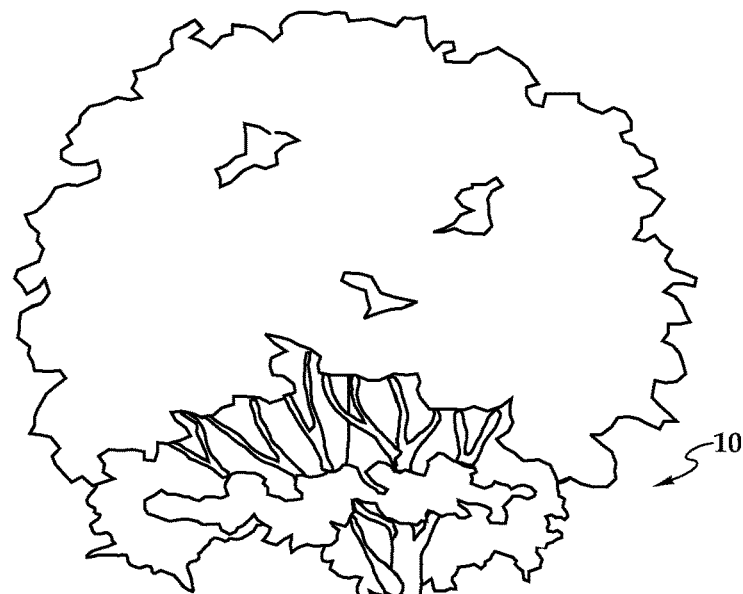
Fig.1
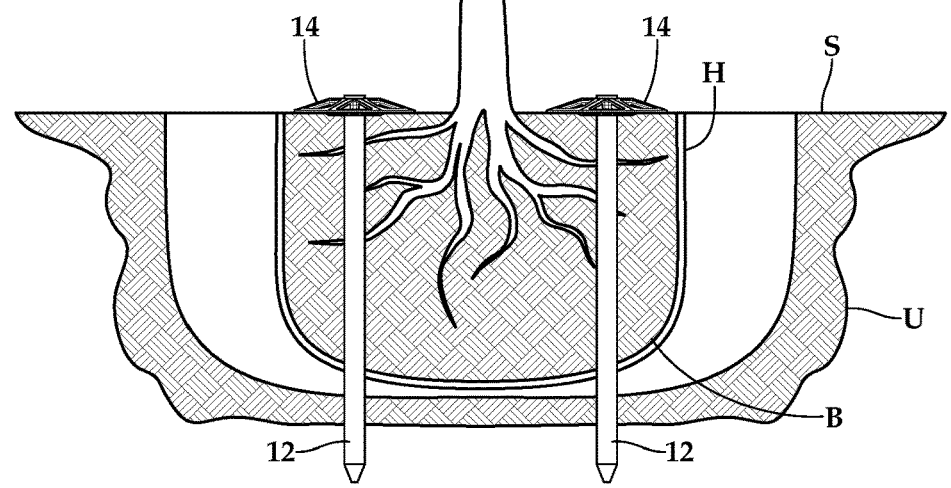
Fig.2
Fig.3

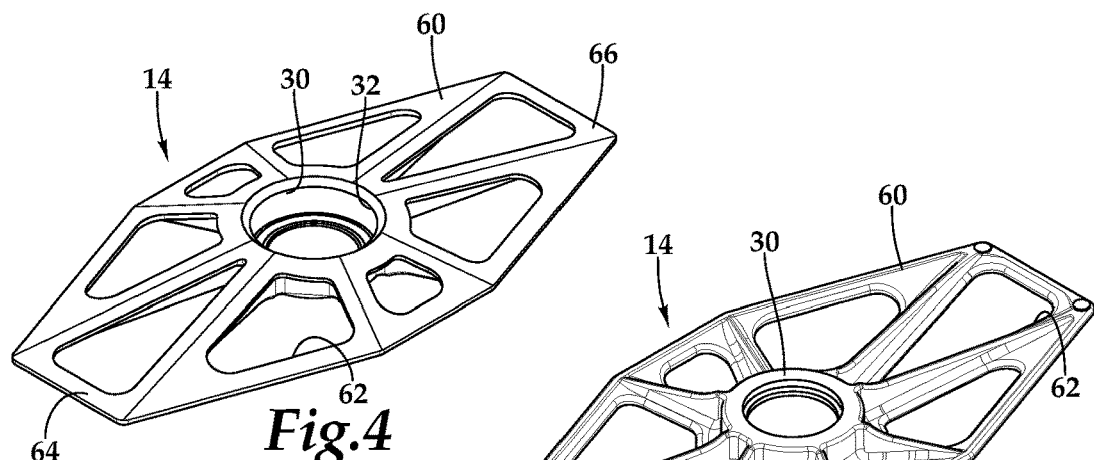
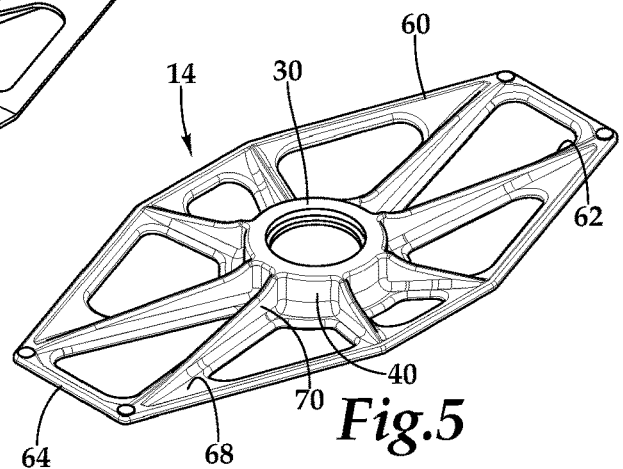
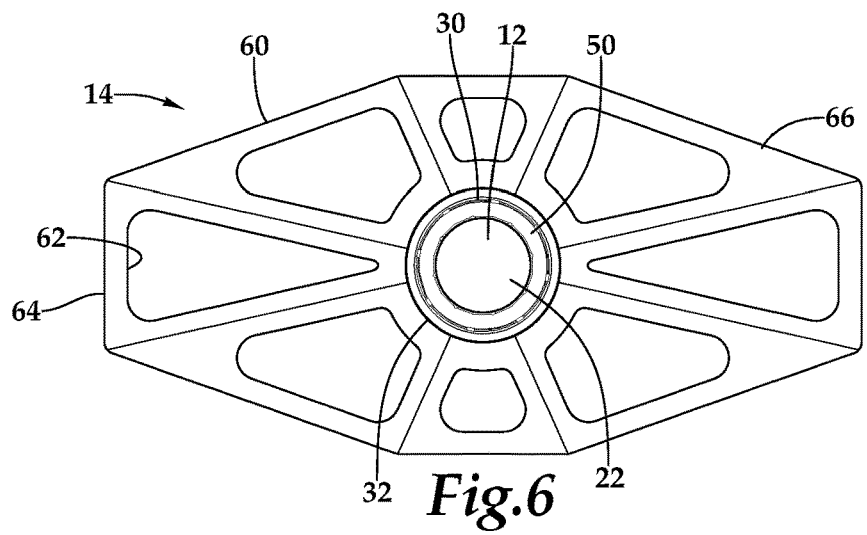
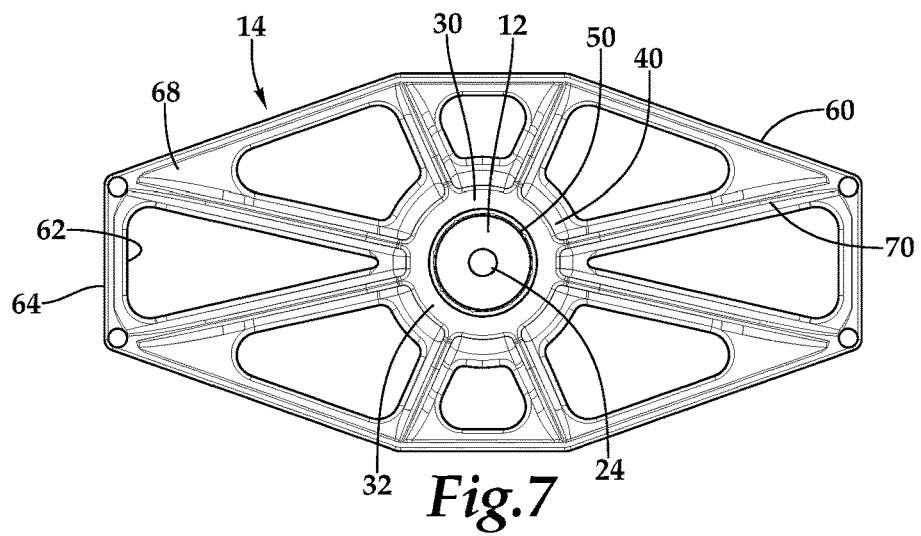

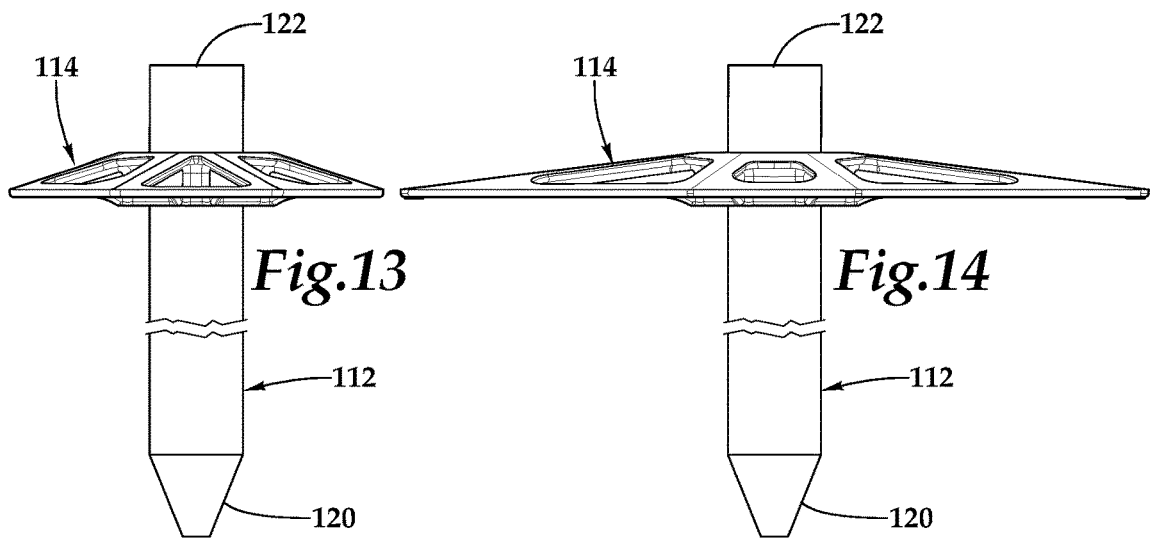
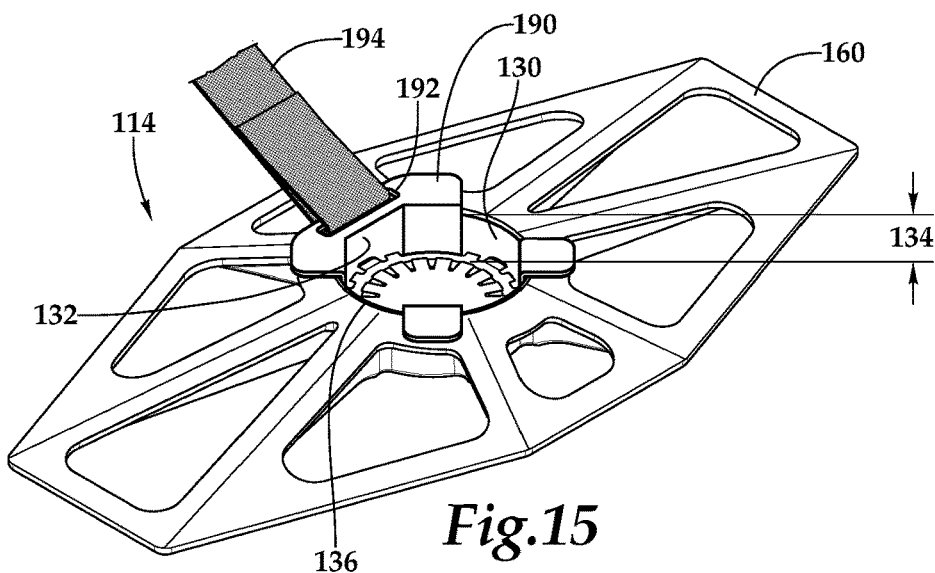
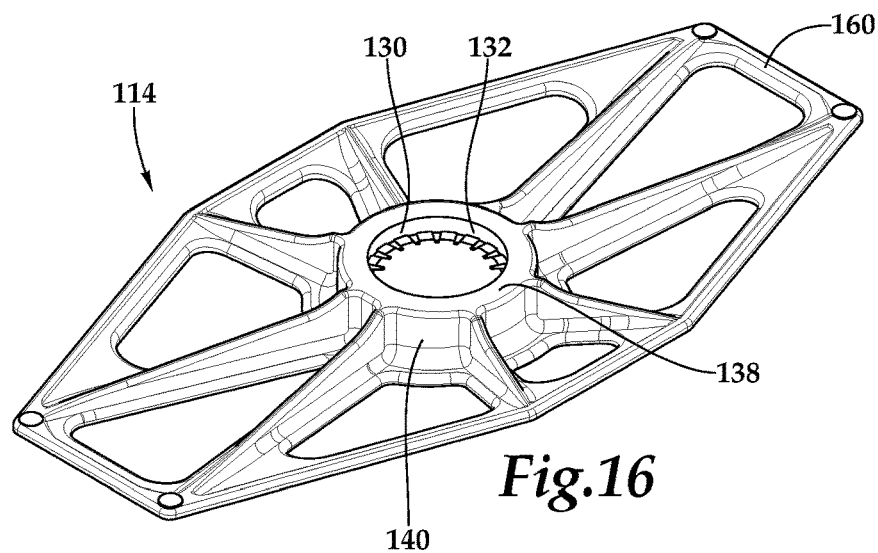

STAKE STABILIZATION MEMBER AND EROSION CONTROL SYSTEM USING SAME

PRIORITY STATEMENT & CROSS-REFERENCE TO RELATED APPLICATION

This application is a continuation-in-part of U.S. patent application Ser. No. 18/449,772 entitled "Arbor Stake Stabilization Member" and filed on Aug. 15, 2023, in the name of Kristopher M. Brown; which is a continuation of U.S. patent application Ser. No. 16/697,677 entitled "Arbor Stake Stabilization Member" filed on Nov. 27, 2019, in the name of Kristopher M. Brown and issued on Aug. 15, 2023 as U.S. Pat. No. 11,723,320; which claims priority from U.S. patent application Ser. No. 62/771,684 entitled "Arbor Stake Stabilization Member" filed on Nov. 27, 2018, in the name of Kristopher M. Brown; all of which are hereby incorporated by reference, in entirety, for all purposes.

TECHNICAL FIELD OF THE INVENTION

This invention relates, in general, to landscaping and, in particular, to a stake stabilization member and erosion control system using the same that provides a physical security to landscaping and the like.

BACKGROUND OF THE INVENTION

Erosion control is an essential aspect of environmental conservation, landscape management, and infrastructure protection. Soil erosion occurs due to the displacement of soil particles by natural forces, such as wind and water, or human activities like construction and agriculture. If not managed effectively, soil erosion can lead to loss of fertile topsoil, reduced agricultural productivity, sedimentation of water bodies, and damage to infrastructure. Various erosion control methods have been developed to mitigate the negative effects of soil erosion. Traditional methods often involve the use of physical barriers, such as retaining walls, gabions, or riprap, which can be labor-intensive, costly, and have a significant visual impact on the environment. More recently, attention has shifted towards more environmentally friendly and sustainable erosion control solutions, such as using vegetation to stabilize soil, promote water infiltration, and reduce runoff.

One challenge in developing effective erosion control systems is the need to balance functionality, ease of installation, and environmental impact. A suitable erosion control system should provide adequate soil stabilization, be easy to install and maintain, and have minimal negative effects on the surrounding ecosystem. Existing solutions have been lacking, however. Accordingly, there is a need for improved systems and methods for providing enhanced erosion control.

SUMMARY OF THE INVENTION

It would be advantageous to achieve a stake stabilization member and an erosion control system using that same that would improve upon existing limitations. It would also be desirable to enable an eco-friendly and sustainable solution that would provide enhanced aesthetics, safety with no impact to the health and success of the landscaping. To better address one or more of these concerns, a stake stabilization member and an erosion control system using the same are disclosed. In one embodiment of the arbor stake stabilization member, a stake with a tapered end for easy ground penetration and a stake stabilization member, which together work to effectively secure and stabilize the soil, preventing erosion and promoting environmental conservation. The stake stabilization member includes an annular ring made from a biodegradable material, contributing to its eco-friendly design. This ring features an axial passageway that allows the stake to pass through from the upper end to the lower end, securing the stake in place. A locking member, made from a non-biodegradable material, extends radially inward into the axial passageway, partially obstructing it to ensure a tight fit and secure connection between the stake and the stabilization member.

Additionally, the erosion control system includes a plate that extends outwardly from the annular ring. This plate is made from a biodegradable material, and may have a that design allows for effective water drainage while maintaining soil stability. In summary, this inventive erosion control system offers an effective and environmentally friendly solution for soil stabilization and erosion prevention. Its unique design, featuring a combination of biodegradable and non-biodegradable materials, ensures secure stake placement, effective water drainage, and reduced environmental impact. This system significantly improves erosion control practices and contribute to better landscape management and environmental conservation efforts. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic diagram depicting one embodiment of a system for landscape stabilization utilizing multiple arbor stake stabilization members according to the teachings presented herein during an installation of a tree;

FIG. 2 is a front elevation view depicting one embodiment of the system of FIG. 1 including an arbor stake stabilization member and an arbor stake in additional detail;

FIG. 3 is a side elevation view depicting one embodiment of the system of FIG. 1 in additional detail;

FIG. 4 is a front top perspective view of one embodiment of the arbor stake stabilization member used in FIG. 1;

FIG. 5 is a front bottom perspective view of the arbor stake stabilization member used in FIG. 4;

FIG. 6 is a top plan view of the arbor stake stabilization member depicted in FIG. 4;

FIG. 7 is a bottom plan view of the arbor stake stabilization member depicted in FIG. 4;

FIG. 13 is a front elevation view depicting one embodiment of the erosion control system of FIG. 12 including a stake stabilization member and a stake in additional detail;

FIG. 14 is a side elevation view depicting the erosion control system of FIG. 13 in additional detail;

FIG. 15 is a front top perspective view of the stake stabilization member used in FIG. 13;

FIG. 16 is a front bottom perspective view of the stake stabilization member used in FIG. 13;

DETAILED DESCRIPTION OF THE INVENTION

Figure 8:
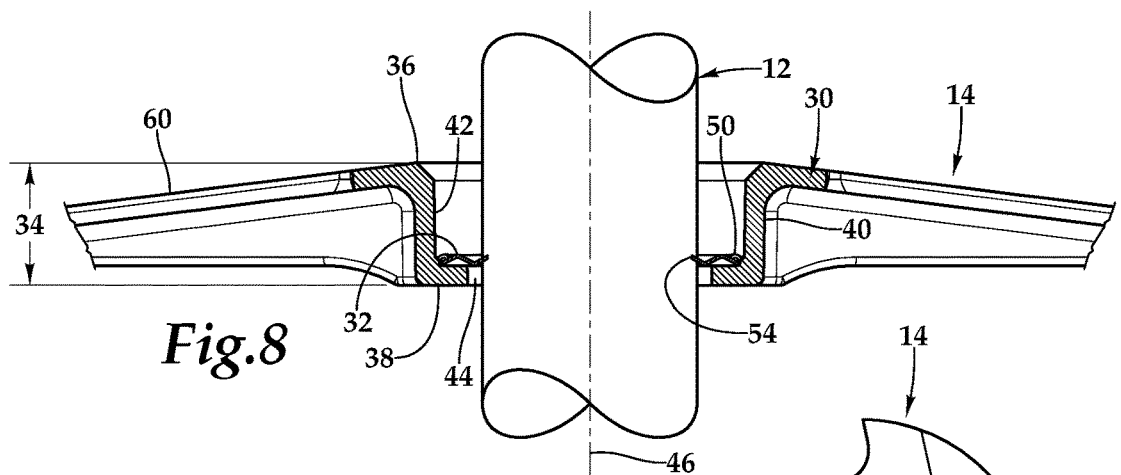
FIG. 8 is a partial cross-sectional view of the system depicted in FIG. 3 including the arbor stake stabilization member and the arbor stake.
Figure 9:
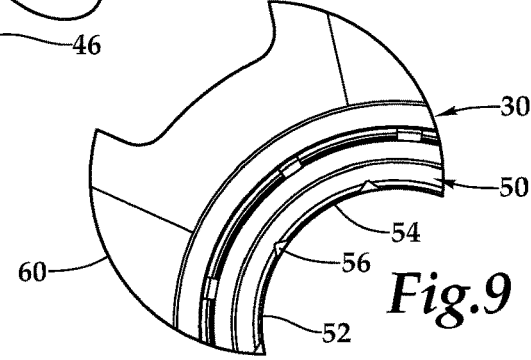
FIG. 9 is a top plan view depicting additional detail of the arbor stake stabilization member depicted in FIG. 7.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the present invention.

Referring initially to FIG. 1, therein is depicted one embodiment of a system 10 for landscape stabilization. A tree T includes a rootball B, which is disposed in hole H under the surface S. Placing a rootball in a hole is a common scenario in landscaping when planting trees, shrubs, and other plants. In the presently illustrated embodiment after the hole H has been dug, the tree T is installed. Arbor stakes 12 and Arbor stake stabilization members 14 are utilized to stabilize the tree T. More specifically, arbor stake stabilization members 14 are positioned at or under the surface S and then respective arbor stakes 12 driven through rootball B into native, undisturbed soil U so that rootball B is held in place by the arbor stakes 12. Typically, the arbor stakes 12 are driven in as far as possible so that the tree T will experience increased stability versus having no stabilization system 10 at all. The arbor stake stabilization members 14 provide stability for the arbor stakes 12 by holding the arbor stakes 12 in place, preventing lateral movement.

The system 10 shown in FIG. 1 may be analogized to a system for stabilizing a ball (rootball B) in a socket (hole H). Generally speaking, if there is a ball in a socket and pins are run through that ball and into the socket, that ball will not typically roll around in the socket. Embodiments of the invention offer additional stability in the form of the arbor stake stabilization members 14. The arbor stake stabilization members 14 provide a way of securing the pins (arbor stakes 12) against ball and socket movement. Generally, the more arbor stakes 12 and arbor stake stabilization members 14 that are used, the more stability that is imparted to the tree T (or other plant).

Referring now to FIG. 2 through FIG. 9, the arbor stake 12 may be made of any of a variety of materials, and in some embodiments the arbor stake 12 may be made from a biodegradable material, such as wood, for example. In fact, the arbor stake 12 may be made of any material with enough longitudinal rigidity to allow the arbor stake 12 to be forced through a tree's rootball and into the underlying ground. Each arbor stake 12 includes tapered end 20 and a flat end 22. The tapered end 20 may include a point 24 for driving the arbor stake 12 into the tree's rootball B and the underlying soil S. The flat end 22, on the other hand, can, for example, be hit with a hammer or other object in order to drive tapered end 20 through a rootball B and into the soil S. An end cap 26 (shown in FIG. 2 and not shown in FIG. 3) may be placed over the flat end 22 during hammering in order to protect flat end 22 from direct hammer blows. The end cap 26 may stay on the arbor stake 14 or, alternatively, be removed after the arbor stake 14 is driven to its desired depth. The end cap 26 may be composed of a biodegradable material or a different, non-biodegradable material. As alluded, the arbor stake 12 may be referred to as providing vertical support. However, it is not required that the arbor stake 12 be arranged exactly vertically, as substantially vertically is within the scope of embodiments.

Figure 10:
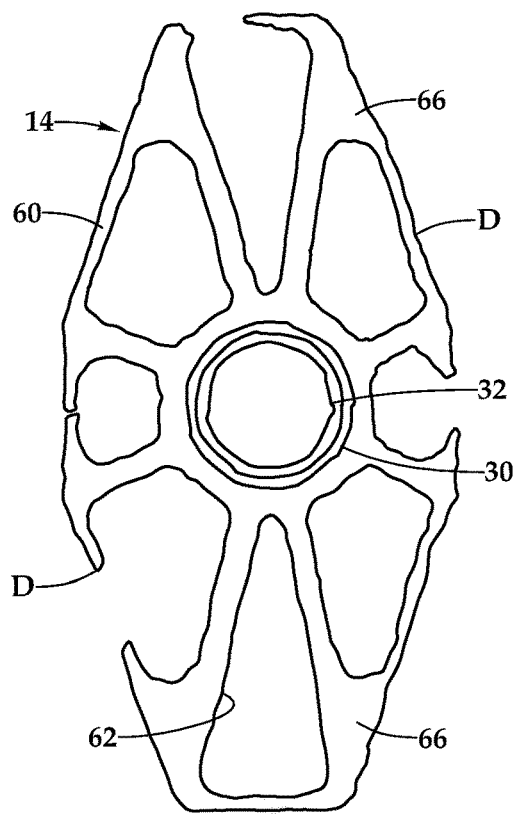
FIG. 10 is a top plan view of the arbor stake stabilization member depicted in FIG. 6 following utilization and a lapse of time.

The arbor stake stabilization member 14 may also be made out of a variety of materials, and especially biodegradable materials, such as wood, bamboo, biodegradable plastic (hereinafter referred to as "bioplastic," an example of which is the corn-based plastic available under the name MIREL™), and the like. As shown in FIG. 10, the benefit of using a biodegradable material for the arbor stake stabilization member 14 and components thereof, is over time the arbor stake stabilization member 14 will degrade as shown by degradation D. Therefore, no need exists to return to the tree T to remove the arbor stake stabilization member 14 from the ground.

Referring again to FIG. 2 through FIG. 9, typically, the arbor stake stabilization member 14 is a long strip-like form of material with a thicknesses much smaller than a length and a width dimensions. The dimensions of each arbor stake stabilization member 14 can be tailored for its intended use. Further, embodiments presented herein are not limited to any dimension for arbor stakes 12 or arbor stake stabilization members 14, as dimensions may differ for different applications. The arbor stake stabilization member 14 may be referred to as providing horizontal support. However, it is not required that the arbor stake stabilization member 14 be arranged exactly horizontally, as substantially horizontally, or otherwise conforming to a top surface of a rootball, is within the scope of embodiments.

In various embodiments, the arbor stake 12 is driven through a rootball of a newly-planted tree, while the arbor stake stabilization member 14 is placed parallel to the soil to provide lateral stability to the arbor stake 12. In one embodiment, the arbor stake stabilization member 14 includes a body 30 that is an annular ring 32 having a length 34 from an upper end 36 to a lower end 38. As shown, the annular ring 32 includes an exterior surface 40 and an axial passageway 42 therethrough. The annular ring 32 may be a biodegradable material.

The axial passageway 42 is sized to accept the arbor stake 12 therethrough. As depicted, the axial passageway 42 includes a periphery 44 and a center 46. A locking member 50 is coupled to the annular ring 32 and the locking member 50 extends radially inward into the axial passageway 42. The locking member 50 may partially obstruct the axial passageway 42 at the periphery 44 thereof and the locking member 50 is unobstructing of the center 46 of the axial passageway 42. The locking member 50 includes a contact material 52 with a contact surface 54 having, in one embodiment, a toothed-profile 56. In one implementation, the toothed-profile may make a biting engagement into the arbor stake 12. The contact material 52 may be different than the biodegradable material of the annular ring 32. In one implementation, the contact material 52 may be an unfinished metal.

As shown, the locking member 50 is sized to accept the arbor stake 12 therethrough in an interference fit with the toothed-profile 56 of the contact surface 54 of the locking member 50. In one embodiment, a plate 60 extends circumferentially outwardly from the annular ring 32. The plate 60 may have multiple openings 62. In one embodiment, the plate 60 may be composed of the same material as the annular ring 32 or another biodegradable material. The multiple openings 62 increase the exposed surface area of the plate 60 to increase the rate of biodegradation, when the arbor stake stabilization member 14 is beneath the surface of the ground. In one embodiment, the multiple openings 62 are non-arbor stake openings that are not sized to engage an arbor stake. In another embodiment, the multiple openings 62 may be at least 30% of the surface area of the plate 60. In still another embodiment, the multiple openings 62 may be at least 50% of the surface area of the plate 60.

Figure 11:
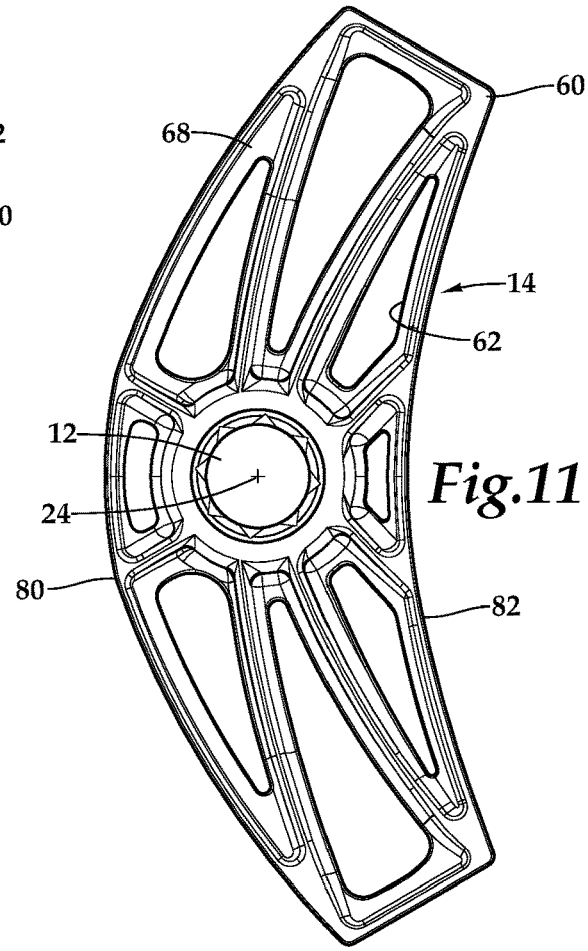
FIG. 11 is a top plan view of another embodiment of an arbor stake stabilization member according to the teachings presented herein.

In the illustrated embodiment, the plate 60 has a diamond-like shape 64 with a length greater than a width. The plate 60 may have an upper side 66 and a lower side 68. As shown, the plate 60 extends circumferentially outward from the annular ring 32 at an angle to span the length 34 of the annular ring 32. Multiple gussets 70 join the lower side 68 of the plate 60 to the exterior surface 40 of the annular ring 32. The gussets 70 provide additional support. It should be appreciated that other designs of plates 60 for the arbor stake stabilization member 14 are within the teachings presented herein. The size and shape of the plate 60 will vary depending on application and landscape design criteria. By way of example and not by way of limitation, with reference to FIG. 11, the plate 60 may have a form bounded by arcuate sides 80, 82.

Figure 12:
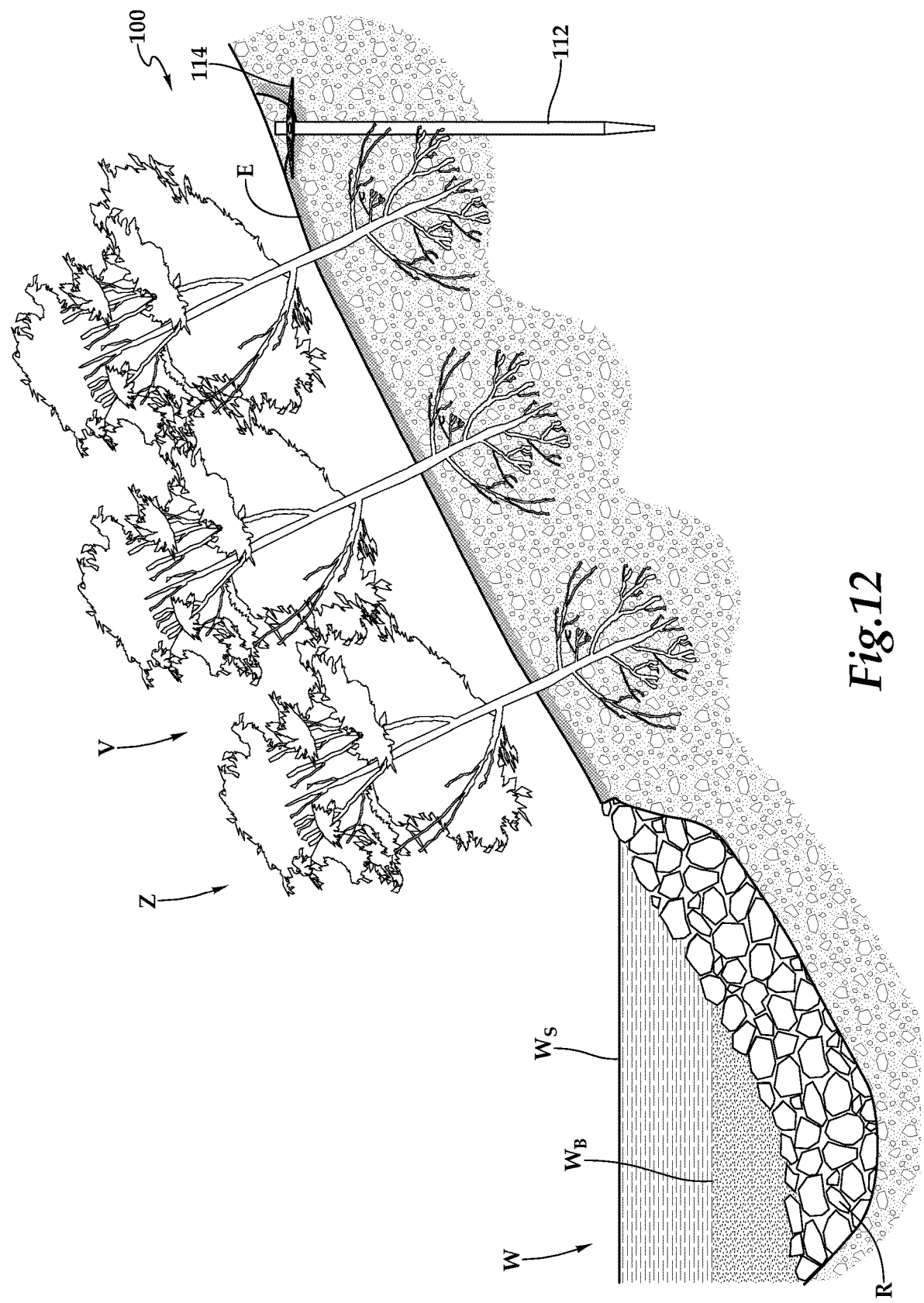
FIG. 12 is a schematic diagram depicting a further embodiment of a system for erosion control—using multiple members—for streambank and shoreline stabilization utilizing multiple stake stabilization members according to the teachings presented herein during an installation of landscaping.
Figure 17:
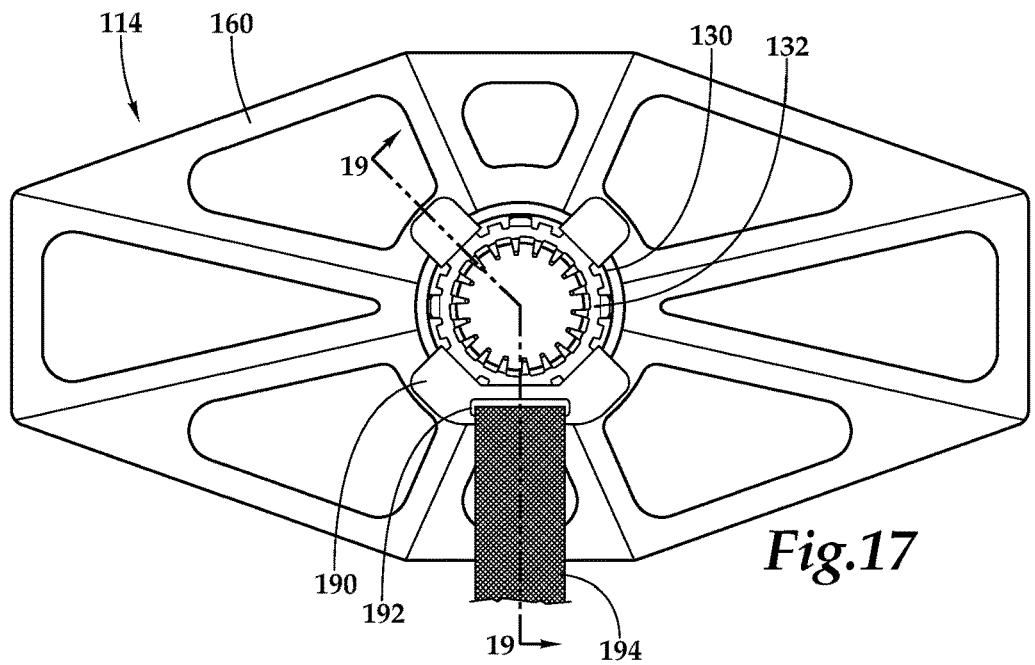
FIG. 17 is a top plan view of the stake stabilization member depicted in FIG. 13.
Figure 18:
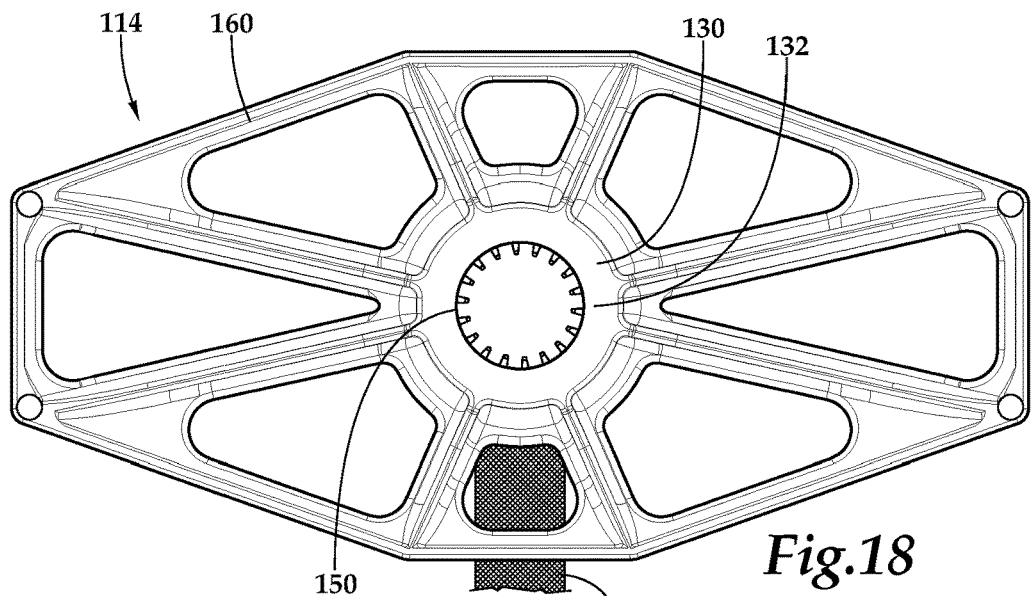
FIG. 18 is a bottom plan view of the stake stabilization member depicted in FIG. 13.
Figure 19:
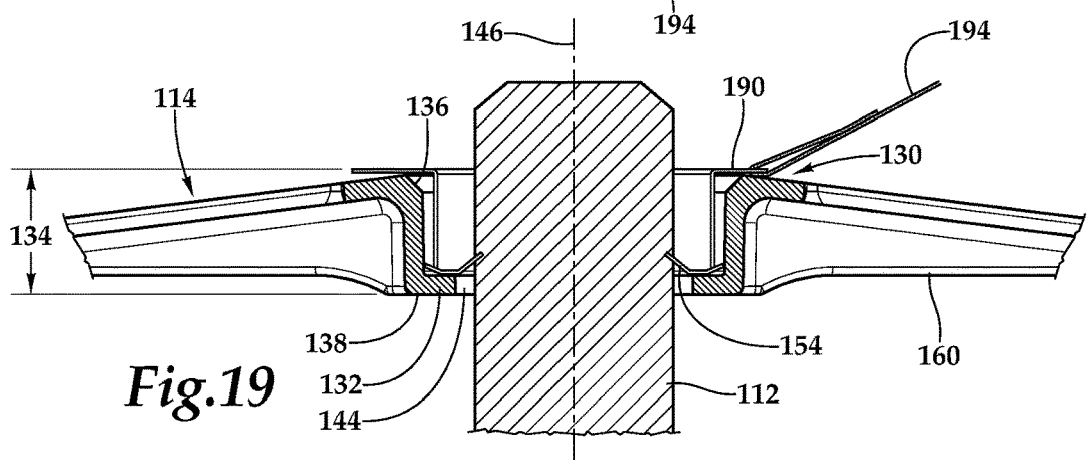
FIG. 19 is a partial cross-sectional view of the erosion control system depicted in FIG. 13 including the stake stabilization member and the stake.

Referring now to FIG. 12, in another embodiment, an erosion control system 100 is depicted, which includes a stake 112 and a stake stabilization member 114 with biodegradable components that provide support and stability to the stake while minimizing environmental impact. As shown in FIG. 12, streambank and shoreline stabilization Z is often a critical process in the management of water bodies, including rivers, streams, and coastal areas, including water W having base flow $W_B$ and stream-forming flow $W_S$. It involves the implementation of various techniques and measures to prevent erosion, protect the integrity of the water body, and enhance the surrounding environment. The primary goal of streambank and shoreline stabilization is to mitigate the effects of natural and human-induced factors that contribute to erosion and degradation of these areas.

In a typical streambank and shoreline stabilization process, the first step involves conducting a thorough assessment of the streambank or shoreline to identify the factors contributing to erosion, such as water flow, wave action, vegetation loss, and human activities. Based on the assessment, a comprehensive stabilization plan is developed, considering factors like soil type, topography, and local ecosystem. One of the most effective methods for stabilizing streambanks and shorelines is the planting of native vegetation, such as vegetation V that is depicted as live cuttings. Grasses, shrubs, and trees may be utilized to help anchor the soil, reduce the impact of water flow and wave action, and provide habitat for wildlife. The vegetation V also improves water quality by filtering pollutants and reducing sediment runoff.

Various erosion control devices, such as riprap, gabions, and retaining walls, may be used to provide physical barriers against erosion. These structures are designed to absorb the energy of flowing water and waves, preventing the soil from being washed away. The various erosion control devices may also be supplemented with bioengineering techniques that combine engineering principles with ecological concepts to create natural, sustainable solutions for streambank and shoreline stabilization. Techniques such as live staking, brush layering, and coir logs use living plant materials to reinforce the soil and promote vegetation growth. As illustrated, retaining wall R, erosion control fabric E, and the erosion control system 100 are employed.

In some cases, as shown, the slope of the streambank or shoreline may need to be regraded to reduce the risk of erosion. A gentler slope reduces the velocity of water flow and wave action, making it less likely for the soil to erode. After implementing stabilization measures, it is essential to monitor the area regularly to ensure the effectiveness of the interventions. Maintenance activities may include removing debris, repairing erosion control devices, and replanting vegetation as needed. Streambank and shoreline stabilization is a long-term process that requires ongoing efforts to protect these vital areas from erosion and degradation. By implementing a combination of engineering and ecological techniques, it is possible to achieve sustainable and resilient streambanks and shorelines that benefit both the environment and the communities that rely on them. The erosion control system 100 disclosed herein furthers this combination of engineering and ecological techniques to achieve these benefits.

It should be appreciated, however, that the erosion control system 100 may be used to secure plant material, erosion control devices, and related appurtenances. By way of example and not by way of limitation, the application of the erosion control system 100 may be in live fascines, which are bundles of live cuttings bound together and placed in shallow trenches along contours to reduce surface erosion. The stakes 112 and stabilization members 114 of the erosion control system 100 can be used to anchor the live fascines in place, ensuring their stability and promoting the growth of vegetation. The erosion control system 100 can also be used in branchpacking, a technique that involves placing live cuttings in trenches perpendicular to the slope to reduce erosion and promote vegetation growth. The stakes 112 and stabilization members 114 can be used to secure the live cuttings, preventing them from being dislodged by water flow or wind. In vegetated geogrids, the erosion control system 100 can be used to anchor geogrids that are filled with soil and planted with vegetation. The stakes 112 and stabilization members 114 provide stability to the geogrids, preventing them from shifting or collapsing under the weight of the soil and vegetation.

The erosion control system can also be used in brushmattress, a technique that involves placing live cuttings on a slope and securing them with stakes. The stabilization members 114 can be used to further anchor the live cuttings, ensuring their stability and promoting vegetation growth. In coconut fiber rolls, the erosion control system 100 can be used to anchor the rolls, which are made of coconut fiber and filled with soil. The stakes 112 and stabilization members 114 provide stability to the rolls, preventing them from shifting or collapsing under the weight of the soil.

The erosion control system 100 can also be used in joint planting, a technique that involves planting vegetation in the joints of rock or concrete structures. The stakes 112 and stabilization members 114 can be used to secure the vegetation, ensuring its stability and promoting growth. In vegetated rock gabions, the erosion control system 100 can be used to anchor the gabions, which are rock-filled wire cages planted with vegetation. The stakes 112 and stabilization members 114 provide stability to the gabions, preventing them from shifting or collapsing under the weight of the rocks and vegetation. The erosion control system 100 can also be used in tree revetments, which involve placing trees along a streambank or shoreline to reduce erosion. The stakes 112 and stabilization members 114 can be used to anchor the trees, ensuring their stability and promoting vegetation growth. By way of further example, in erosion and sediment control, the erosion control system 100 can be used to secure erosion control devices such as silt fences, straw wattles, and sediment basins. The stakes 112 and stabilization members 114 provide stability to the devices, preventing them from being dislodged by water flow or wind.

In sand dune stabilization, the erosion control system 100 can be used to anchor vegetation planted on sand dunes to reduce wind erosion. The stakes 112 and stabilization members 114 provide stability to the vegetation, preventing it from being dislodged by wind. As discussed above, the erosion control system disclosed herein provides a versatile and effective solution for stabilizing soil, preventing erosion, and promoting vegetation growth in a variety of applications. The following description provides further details and embodiments relative to the erosion control system 100.

Referring now to FIGS. 13 through 19, the stake 112 is a linear member with a flat end 120 and a tapered end 122. The tapering allows for easier penetration into the ground during installation. The stake 112 can be made from a variety of materials, including but not limited to wood, metal, or plastic. The length and diameter of the stake 112 can be selected based on the specific application and the type of soil in which the erosion control system 100 will be installed.

The stake stabilization member 114 includes several components: a body 130, a locking member 150, and a plate 160. The body 130 of the stake stabilization member is an annular ring 132 made from a biodegradable material, which can be a biodegradable plastic or another suitable material. The biodegradable material ensures that the body 130 decomposes over time, reducing the environmental impact of the erosion control system 100. The annular ring 132 has a length 134 from an upper end 136 to a lower end 138, an exterior surface 140, and an axial passageway 142 therethrough. The axial passageway 142 is sized to accept the stake 112, allowing the tapered end 122 of the stake 112 to travel from the upper end 136 through the lower end 138, placing the flat end 120 proximate the upper end 136 of the body 130. The axial passageway 142 has a periphery 144 and a center 146.

The locking member 150 is coupled to the annular ring 132 and extends radially inward into the axial passageway 142. It is made of a non-biodegradable material, which can be an unfinished metal or an untreated oxidizable material. The locking member 150 partially obstructs the axial passageway 124 at the periphery thereof but does not obstruct the center 46 of the axial passageway 124. The locking member 150 features a contact surface 154 with a toothed profile 156, providing an interference fit between the stake and the locking member. This interference fit enables the toothed-profile 156 of the contact surface 154 to bite into the stake 112 by way of a hammer-driven action, securely holding the stake 112 in place.

The plate is made of a third biodegradable material, which can be the same as or different from the first material. It extends circumferentially outwardly from the annular ring and has an upper side and a lower side, with the plate extending at an angle to span the length of the annular ring. The plate includes a plurality of openings, which can have various shapes and sizes to facilitate water flow and prevent soil erosion. The lower side of the perforated plate is joined to the exterior surface of the annular ring by a plurality of gussets. These gussets provide additional structural support to the plate and the annular ring. In certain embodiments, the plate may have a diamond shape with a length greater than its width, providing further rigidity and support to the stake stabilization member.

In some embodiments, the erosion control system 100 further comprises a securing member 190 coupled to the body 130 of the stake stabilization member 132. The securing member 190 extends above the upper end 134 of the annular ring 132 and has a strap-receiving slot 192 adapted to securely hold a strap 194. The strap 194 has various uses. The strap 194 can be used to secure vegetation, such as live fascines, branchpacking, or other plant material, to the stake stabilization member 114. This helps anchor the vegetation to the ground, preventing it from being dislodged by water flow, wind, or other forces. The strap 194 may also be used to anchor other erosion control devices, such as coconut fiber rolls, erosion control logs, or sediment basins, to the stake stabilization member. This ensures that the devices remain in place and effectively prevent erosion.

By way of further example, the strap 194 can be used to further stabilize the stake 194 by wrapping it around the stake 112 and securing it to the stake stabilization member 114. This provides additional support to the stake 112, preventing it from shifting or being dislodged. The strap 194 may be used to bundle materials, such as live cuttings or brushmattress, together. This makes it easier to handle and transport the materials and ensures that they remain in place once installed. By way of further example, the strap 194 can be used to attach accessories, such as end caps, to the stake or stake stabilization member. This helps protect the components of the erosion control system and enhances their functionality. The strap 194 may be used to connect multiple stakes 112 and stake stabilization members 114 together, creating a larger, more stable erosion control system that may or may not be connected to an erosion control fabric. This is particularly useful in applications where a larger area needs to be stabilized. By way of further example, the strap 194 can be used to adjust the position of the stake 112, allowing it to be moved or repositioned as needed. This is useful in applications where the stake 112 needs to be adjusted to accommodate changes in the landscape or other factors.

Continuing with the description of the erosion control system 100, many variations in the stake 112 and stake stabilization member 114 similar to the variations with respect to the arbor stakes 12 and arbor stakes stabilization member 114 are possible. By way of example, the plate 160 of the stake stabilization member 114 includes an upper side and a lower side. The plate 160 may extend circumferentially outwardly from the annular ring 132 at an angle to span the length 134 of the annular ring 132. In some embodiments, gussets join the lower side of the plate 160 to the exterior surface 140 of the annular ring 132, providing additional structural support to the plate 160 and the annular ring 132. The plate 160 may include openings, which can have various shapes and sizes to facilitate water flow and prevent soil erosion. In some embodiments, the plate 160 may be a solid form without any openings. The plate 160 may also be a biodegradable material, which may be the same as or different from the material used for the annular ring 132. In some embodiments, these materials are identical.

As mentioned, the contact surface 154 of the locking member 150 includes a toothed-profile 156. The interference fit between the stake 112 and the locking member 150 may include the toothed-profile 156 of the contact surface 154 biting into the stake 112 by way of a hammer-driven action on the stake 112. The material of the locking member 150 may be an unfinished metal or an untreated oxidizable material. Further, in some embodiments, the plate 160 further comprises a diamond shape with a length greater than a width. In other embodiments, the plate 160 further comprises a cylindrical shape. The shape of the plate 160 can be selected based on the specific application and the type of soil in which the erosion control system 100 will be installed.

The erosion control system 100 provides a versatile and effective solution for stabilizing soil and preventing erosion in various applications. The stake 112, stake stabilization member 114, and strap 194 work together to anchor vegetation, erosion control devices, and other materials to the ground, ensuring that they remain in place and effectively prevent erosion. The biodegradable materials used for the annular ring 132 and the plate 160 reduce the environmental impact of the erosion control system 100, while the non-biodegradable material used for the locking member 150 ensures that the stake 112 is securely held in place. The various components of the erosion control system 100 can be tailored to suit the specific needs of each application, making it a versatile and effective solution for erosion control. That is, the erosion control system 100 disclosed herein provides a versatile and effective solution for stabilizing soil, preventing erosion, and promoting vegetation growth in a variety of applications. The use of biodegradable materials reduces the environmental impact of the system, while the locking member ensures that the stake is securely held in place. The plate provides surface area contact to the ground, further enhancing the stability of the system.

In operation, the erosion control system 100 is installed by first driving the stake 112 into the ground. Soil is a natural medium composed of mineral particles, organic matter, water, and air. It can be classified into several types based on its texture and particle size, such as sand, silt, clay, loam, and peat. The properties of soil, including texture, structure, and fertility, influence its suitability for different applications, such as supporting plant growth and erosion control. Various plant types, including bushes, trees, ground coverings, grasses, vines, perennials, and annuals, serve functional and aesthetic roles in landscapes and ecosystems. These plants can provide habitat for wildlife, prevent soil erosion, and enhance the visual appeal of environments. Understanding the characteristics of different plant types can inform the selection of suitable plants for erosion control systems and other landscaping or environmental conservation projects.

The stake stabilization member 114 is then placed over the stake 112, with the axial passageway accommodating the stake 112. The locking member 150 engages the stake 112 through an interference fit, ensuring that the stake 112 is securely held in place. The plate 160 provides additional stability and prevents soil erosion. The erosion control system 100 offers an environmentally friendly solution for stabilizing stakes in erosion-prone areas. The use of biodegradable materials in the stake stabilization member 114 reduces the ecological impact of the system, while the locking member 150 and plate 160 ensure the stake 112 remains securely in place, providing effective erosion control.

Figure 20:
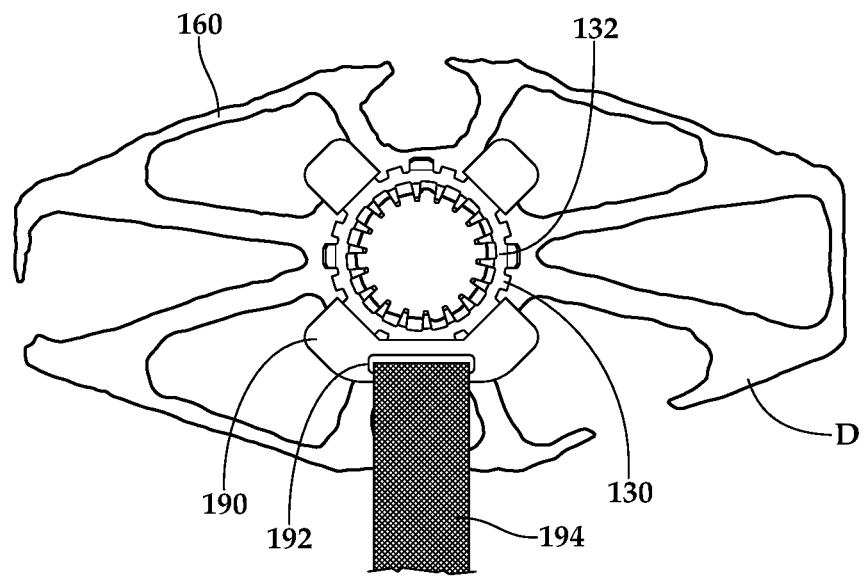
FIG. 20 is a top plan view of the stake stabilization member depicted in FIG. 13 following utilization and a lapse of time.

The use of biodegradable materials for the stake stabilization member 114 and its components, as depicted in FIG. 20, offers several advantages for erosion control applications. One of the most significant benefits is the natural degradation of the stake stabilization member 114 over time, as indicated by degradation D. This natural degradation process eliminates the need for manual removal of the stake stabilization member 114 from the ground, reducing labor costs and minimizing the environmental impact associated with the disposal of non-biodegradable materials. As previously alluded, the biodegradable materials used in the stake stabilization member 114 can be derived from various sources, including natural polymers, renewable resources, or synthetic polymers designed to break down over time. These materials can include biodegradable plastics, bioplastics, or other suitable materials that decompose under natural conditions. The choice of biodegradable material can be tailored to the specific requirements of each erosion control application, considering factors such as the expected duration of use, environmental conditions, and soil type.

The degradation process of the stake stabilization member 114 occurs through natural biological processes, such as microbial activity, enzymatic breakdown, and environmental factors like moisture, temperature, and oxygen levels. As the stake stabilization member 114 degrades, it releases nutrients and organic matter back into the soil, contributing to soil health and fertility. This natural decomposition process enhances the overall sustainability of the erosion control system 100, as it reduces waste generation and promotes soil regeneration.

The use of biodegradable materials in the stake stabilization member 114 also reduces the risk of long-term environmental contamination. Unlike non-biodegradable materials, which can persist in the environment for decades or even centuries, biodegradable materials break down into natural components that do not harm the ecosystem. This feature is particularly important in sensitive environments, such as wetlands, riparian zones, and coastal areas, where the accumulation of non-biodegradable materials can have detrimental effects on local ecosystems. In addition to the environmental benefits, the use of biodegradable materials in the stake stabilization member 114 also offers practical advantages for erosion control applications. The natural degradation of the stake stabilization member 114 reduces the need for maintenance and monitoring, as there is no need to return to the site to remove the stake stabilization member 114 from the ground. This feature simplifies the erosion control process, reduces labor costs, and minimizes the risk of damage to the surrounding environment during removal. In conclusion, the use of biodegradable materials for the stake stabilization member 114 and its components offers numerous advantages for erosion control applications. The natural degradation of the stake stabilization member 114 reduces labor costs, minimizes environmental impact, and promotes soil health and fertility. The choice of biodegradable material can be tailored to the specific requirements of each erosion control application, ensuring optimal performance and sustainability.

Figure 21:
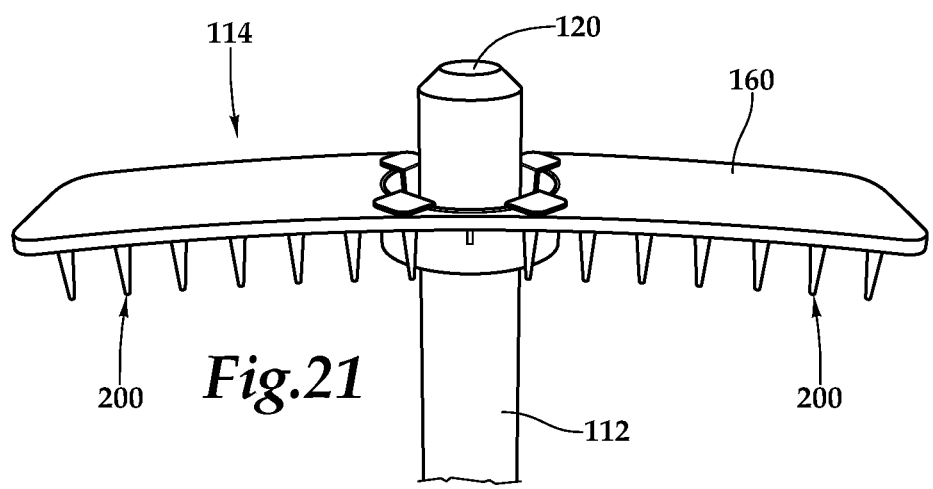
FIG. 21 is a front top perspective view of a further embodiment of the erosion control system.
Figure 22:
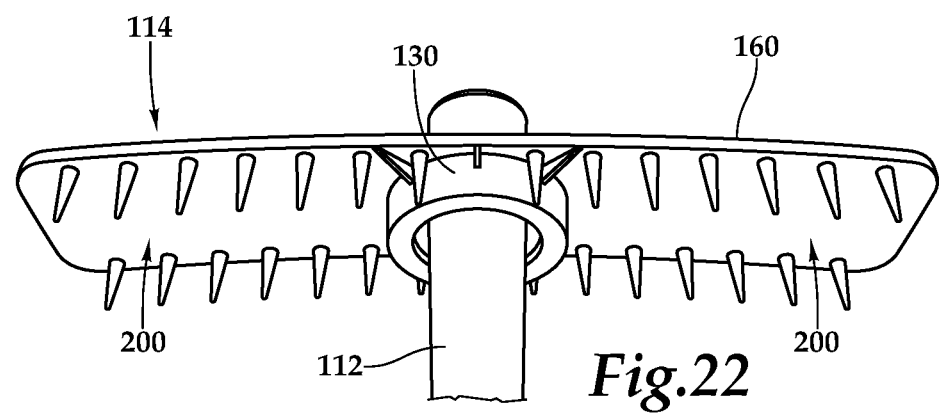
FIG. 22 is a front bottom perspective view of the erosion control system depicted in FIG. 21.

In the embodiment depicted in FIGS. 21 and 22, the plate 160 of the stake stabilization member 114 is equipped with a plurality of spikes 200 extending from its surface. These spikes 200 can be designed to penetrate the ground, providing additional anchoring and stability to the erosion control system 100. The spikes 200 can be made of a durable material, such as metal or hard plastic, to ensure effective penetration into the soil or, the spikes may be made of biodegradable material as discussed previously. The length, diameter, and spacing of the spikes 200 can be tailored to suit the specific needs of each application. The spikes 200 can be particularly useful in applications where the soil is loose or sandy, as they provide additional anchoring and prevent the erosion control system 100 from being dislodged by water flow, wind, or other forces.

Figure 23:
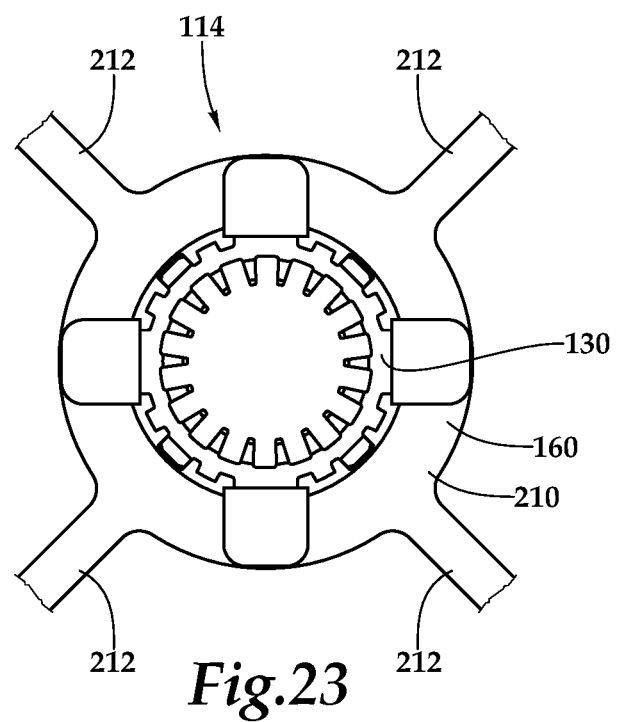
FIG. 23 is a front top perspective view of a still further embodiment of the erosion control system.
Figure 24:
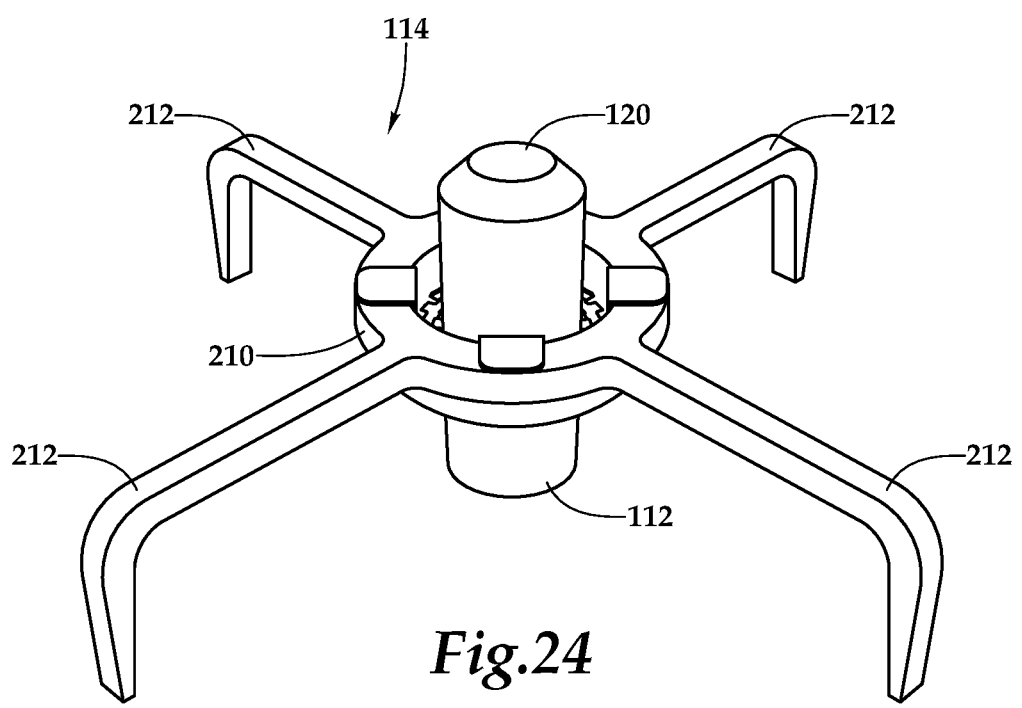
FIG. 24 is a bottom plan view of the erosion control system depicted in FIG. 23.

In the embodiment depicted in FIGS. 23 and 24, the plate 160 of the stake stabilization member 114 has a cylindrical form 210 with a plurality of prongs 212 extending from its surface. These prongs 212 can be designed to grip the ground, providing additional stability to the erosion control system 100. The prongs 212 can be made of a flexible material, such as rubber or soft plastic, or a biodegradable material, for example, to ensure effective grip on the soil. The length, width, and spacing of the prongs 212 can be tailored to suit the specific needs of each application. The prongs 212 can be particularly useful in applications where the ground is uneven or rocky, as they provide additional stability and prevent the erosion control system 100 from shifting or being dislodged.

Both the spikes 200 and the prongs 212 can be used in conjunction with the strap 194 to further secure the erosion control system 100 to the ground. The strap 194 can be wrapped around the stake 112 and the stake stabilization member 114, providing additional support and preventing the components of the erosion control system 100 from shifting or being dislodged. The strap 194 can also be used to bundle materials, such as live cuttings or brushmattress, together, making it easier to handle and transport the materials and ensuring that they remain in place once installed. The erosion control system 100 with the spikes 200 or the prongs 212 provides a versatile and effective solution for stabilizing soil and preventing erosion in various applications. The spikes 200 and the prongs 212 provide additional anchoring and stability to the erosion control system 100, ensuring that it remains in place and effectively prevents erosion. The various components of the erosion control system 100 can be tailored to suit the specific needs of each application, making it a versatile and effective solution for erosion control.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An erosion control system comprising:
   a stake having a first end tapering to a second end, the second end for penetrating ground; and
   a stake stabilization member including:
   a body being an annular ring having a length from an upper end and a lower end, the annular ring having an exterior surface and an axial passageway therethrough, the annular ring being a first material, the first material being a biodegradable material;
   the lower end of the body configured to be held at one of at the ground and under a surface of the ground;
   the axial passageway sized to accept the stake therethrough from the upper end to the lower end such that the second end of the stake travels from the upper end through the lower end to place the first end proximate the upper end of the body, the axial passageway having a periphery and a center;
   a locking member coupled to the annular ring, the locking member extending radially inward into the axial passageway, the locking member partially obstructing the axial passageway at the periphery thereof, the locking member unobstructing the center of the axial passageway;
   the locking member being a contact material with a contact surface, the contact material being a second material, the second material being a non-biodegradable material;
   the locking member sized to accept the stake therethrough in an interference fit; and
   a plate extending outwardly from the annular ring, the plate configured to provide surface area contact to the ground.

2. The erosion control system as recited in claim 1, wherein the plate further comprises an upper side and a lower side, the plate extending circumferentially at an angle to span the length of the annular ring.

3. The erosion control system as recited in claim 2, wherein a plurality of gussets join the lower side of the plate to the exterior surface of the annular ring.

4. The erosion control system as recited in claim 1, wherein the plate includes a plurality of openings.

5. The erosion control system as recited in claim 1, wherein the plate comprises a solid form.

6. The erosion control system as recited in claim 1, wherein the plate further comprises a third material, the third material being a biodegradable material.

7. The erosion control system as recited in claim 6, wherein the first material and the third material are identical.

8. The erosion control system as recited in claim 1, wherein the contact surface further comprises a toothed-profile.

9. The erosion control system as recited in claim 8, wherein the interference fit comprises the toothed-profile of the contact surface biting into the stake by way of a hammer-driven action on the stake.

10. The erosion control system as recited in claim 1, wherein the second material further comprises an unfinished metal.

11. The erosion control system as recited in claim 1, wherein the second material further comprises an untreated oxidizable material.

12. The erosion control system as recited in claim 1, wherein the plate further comprises a diamond shape with a length greater than a width.

13. The erosion control system as recited in claim 1, wherein the plate further comprises a cylindrical shape.

14. The erosion control system as recited in claim 1, further comprising a securing member coupled to the body, the securing member extending above the upper end of the annular ring, the securing member having a strap-receiving slot adapted to securely hold a strap.

15. The erosion control system as recited in claim 1, further comprising a plurality of tines extending from the plate.

16. The erosion control system as recited in claim 1, further comprising a plurality of spikes extending from the plate.

17. A stake stabilization member for use with a stake having a first end tapering to a second end, the second end for penetrating ground, the erosion control system comprising:
- a body being an annular ring having a length from an upper end and a lower end, the annular ring having an exterior surface and an axial passageway therethrough, the annular ring being a first material, the first material being a biodegradable material;
- the lower end of the body configured to be held at one of at the ground and under a surface of the ground;
- the axial passageway sized to accept the stake therethrough from the upper end to the lower end such that the second end of the stake travels from the upper end through the lower end to place the first end proximate the upper end of the body, the axial passageway having a periphery and a center;
- a locking member coupled to the annular ring, the locking member extending radially inward into the axial passageway, the locking member partially obstructing the axial passageway at the periphery thereof, the locking member unobstructing the center of the axial passageway;
- the locking member being a contact material with a contact surface, the contact material being a second material, the second material being a non-biodegradable material;
- the locking member sized to accept the stake therethrough in an interference fit; and
- a plate extending outwardly from the annular ring, the plate configured to provide surface area contact to the ground.

18. The erosion control system as recited in claim 17, further comprising a securing member coupled to the body, the securing member extending above the upper end of the annular ring, the securing member having a strap-receiving slot adapted to securely hold a strap.

19. The erosion control system as recited in claim 17, further comprising a plurality of tines extending from the plate.

20. The erosion control system as recited in claim 17, further comprising a plurality of spikes extending from the plate.

21. A method of controlling erosion using a stabilization system, the method comprising:
- providing a stake having a first end tapering to a second end, the second end for penetrating ground;
- providing a stake stabilization member including:
  - a body being an annular ring having a length from an upper end and a lower end, the annular ring having an exterior surface and an axial passageway therethrough, the annular ring being a first material, the first material being a biodegradable material;
  - a locking member coupled to the annular ring, the locking member extending radially inward into the axial passageway, the locking member partially obstructing the axial passageway at a periphery thereof, the locking member unobstructing a center of the axial passageway, the locking member being a contact material with a contact surface, the contact material being a second material, the second material being a non-biodegradable material; and
  - a plate extending outwardly from the annular ring, the plate configured to provide surface area contact to the ground;
- positioning the lower end of the body at one of at the ground and under a surface of the ground;
- inserting the stake through the axial passageway from the upper end to the lower end such that the second end of the stake travels from the upper end through the lower end to place the first end proximate the upper end of the body;
- engaging the locking member with the stake in an interference fit to secure the stake within the axial passageway; and
- allowing the plate to make surface area contact with the ground to stabilize the stake and control erosion.

* * * * *